(12) United States Patent
Bertsch

(10) Patent No.: US 9,589,750 B2
(45) Date of Patent: Mar. 7, 2017

(54) SWITCH SPRING ARRANGEMENT

(71) Applicant: Amphenol Tuchel Electronics GmbH, Heilbronn (DE)

(72) Inventor: Michael S. Bertsch, Heilbronn (DE)

(73) Assignee: AMPHENOL-TUCHEL ELECTRONICS GMBH, Heilbronn (DE)

( * ) Notice: Subject to any disclaimer, the term of this patent is extended or adjusted under 35 U.S.C. 154(b) by 144 days.

(21) Appl. No.: 14/377,884

(22) PCT Filed: Feb. 14, 2013

(86) PCT No.: PCT/EP2013/000428
§ 371 (c)(1),
(2) Date: Aug. 11, 2014

(87) PCT Pub. No.: WO2013/139420
PCT Pub. Date: Sep. 26, 2013

(65) Prior Publication Data
US 2015/0041296 A1  Feb. 12, 2015

(30) Foreign Application Priority Data

Mar. 22, 2012  (DE) .................. 10 2012 005 852

(51) Int. Cl.
*H01H 27/00*  (2006.01)
*G06K 7/00*  (2006.01)
*H01H 3/38*  (2006.01)
*G07F 7/08*  (2006.01)

(52) U.S. Cl.
CPC ............... *H01H 27/00* (2013.01); *G06K 7/00* (2013.01); *G07F 7/0873* (2013.01); *H01H 3/38* (2013.01); *H01H 2231/006* (2013.01); *H01H 2231/05* (2013.01)

(58) Field of Classification Search
CPC ........... H01H 27/00; H01R 29/00; G06K 7/00
USPC ........ 200/329, 51.09, 51.1, 51.11, 46, 61.59, 200/47; 235/486; 439/188
See application file for complete search history.

(56) References Cited

U.S. PATENT DOCUMENTS

| | | | |
|---|---|---|---|
| 5,807,124 A | 9/1998 | Bricaud et al. | |
| 6,045,049 A | 4/2000 | Nishimura et al. | |
| 6,169,257 B1* | 1/2001 | Bricaud | G06K 7/0021 200/46 |
| 6,399,906 B1 | 6/2002 | Sato et al. | |

FOREIGN PATENT DOCUMENTS

| | | | |
|---|---|---|---|
| CN | 1129040 A | 8/1996 | |
| CN | 1221198 A | 6/1999 | |
| DE | 44 11 345 | 5/1995 | |
| DE | 196 167 86 | 11/1997 | |
| DE | 19616786 | * 11/1997 | ............... G06K 7/01 |

(Continued)

*Primary Examiner* — Edwin A. Leon
*Assistant Examiner* — Iman Malakooti
(74) *Attorney, Agent, or Firm* — Blank Rome LLP

(57) ABSTRACT

The invention relates to a switch spring arrangement for operating a switch, comprising a first spring arm that can be actuated by a card, and at least one second spring arm, with a contact dome at the free end thereof, for operating a switch that is located beneath the contact dome of the second spring arm, wherein the first spring arm can be actuated by the second spring arm.

10 Claims, 2 Drawing Sheets

(56) References Cited

FOREIGN PATENT DOCUMENTS

| | | | |
|---|---|---|---|
| JP | H10320511 | A | 12/1998 |
| JP | 2004031279 | A | 6/1999 |
| JP | H11250965 | A | 9/1999 |

* cited by examiner

SWITCH SPRING ARRANGEMENT

RELATED APPLICATIONS

This application is a National Phase of PCT/EP2013/000428, filed on Feb. 14, 2013, which claims priority to German Patent Application 10 2012 005 852.7, filed Mar. 22, 2012, all of the disclosures of which are hereby incorporated by reference herein.

The invention relates to a switch spring arrangement, in particular to a switch spring arrangement for card readers, in particular for chip and memory card readers, such as a smartcard connector for example, into which different chip or memory cards can be inserted.

Switching operator means or switch spring arrangements are usually used in card readers in order to identify so-called chip cards, such as smartcards, microSD cards, TransFlash cards or other types of card, when said cards are inserted into the card reader in which the switch spring arrangement is operated by the card which is to be inserted and a contact is either opened or closed.

Arrangements of this kind are called "normally open" or "normally closed card reader arrangements", wherein "normally open" means that the card presence switch is in its open state when no card is inserted and, when the card is inserted, the card presence switch is moved by the card to a closed state, whereas in the case of a "normally closed card reader", the process proceeds in precisely the opposite way.

One problem with switch spring arrangements of the prior art can be seen in that, as the dimensions of card readers become ever smaller, the switch spring arrangements and the switching paths thereof are subject to interference primarily due to tolerances during use.

For example, the switch spring may break if a card reader has to run through up to 500,000 switching cycles as part of its switch operations over its service life.

Particularly in the case of payment terminals and card contact-making apparatuses which execute several 100 to 1000 reading processes per day, this leads to a short service life and costly repairs to and servicing of the card reading apparatuses being required.

A first problem can be seen in that the dimensions, in particular the height of the actual card reader, is so low that the switch spring arrangements can have either only short spring paths and therefore stiff contacts or, as an alternative, long switch springs can be used but these have excessively low contact forces.

Switching operator means of the design known from the prior art generally transmit the forces directly to the switch and, given a small overall size, ensure only a low level of tolerance compensation. However, tolerance compensation is required if the switch is blocked for example and the card pushes more on the operator means.

It should be noted here that, in the market, card thickness tolerances also have to be accommodated by the switch operator means. So-called minimum and maximum cards are available, that is to say the card thickness changes, generally depending on the manufacturer, to different card thicknesses, which lie within a prespecified tolerance range, on the market.

When the switch is, as it were, blocked, that is to say bears or is pressed against a fixed structure or wall at the end of its operating movement, the forces are transmitted directly to the switch, and this can lead to the switch breaking. This occurs primarily with "relatively thick" maximum cards.

The objective of the present invention is to overcome the abovementioned disadvantages and to provide a switch spring arrangement for operating a switch which has a high level of operational reliability and compensates for or minimizes said disadvantages.

This object is achieved by a switch spring arrangement as claimed in claim 1.

Preferred refinements of the invention can be found in the dependent claims.

In order to be able to ensure sufficient tolerance compensation, the basic idea of the present invention is that the spring arm of a switch operator means is initially designed to be of sufficient length, this having a positive influence on the overall size.

As the length of the spring arm increases, the spring force which is exerted by the spring arm and can be transmitted to the switch also drops, and therefore the switch is subject to less loading owing to less force being transmitted.

However, in the case of the solution according to the invention, two spring arms are used, said spring arms firstly experiencing an extension owing to material gathering and furthermore, having one, or in each case one, contact point, said contact points preferably being formed by corresponding projections and serving to act as intermediate bearings between the spring arms which are involved. In this way, the spring arms which are involved can deform independently of one another.

As a result, owing to the embodiment according to the invention of preferably two spring arms in pairs which cooperate with a further spring arm which is situated between them, the overall size can be minimized and the force which is to be transmitted can be increased with the spring arms being long at the same time, with the result that sufficient force transmission can be exerted on the switch.

However, less mechanical stress is generated in the component as a result, this reducing the service life both of the switch spring arrangement itself and also of the switch which is tripped by the switch spring arrangement, and therefore increasing the service life of a card reader overall.

Further advantages, objectives and details of the invention can be found in the description of an exemplary embodiment with reference to the drawings. In the drawing:

FIG. 1 to FIG. 5 show different views of an exemplary embodiment of a switch spring arrangement 1 according to the invention.

Figure 1:
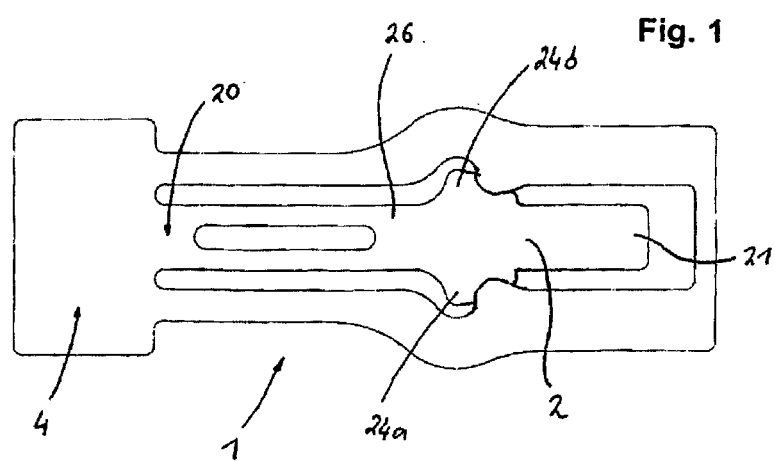
FIG. 1 shows a plan view of a switch spring arrangement.

The switch spring arrangement 1 according to FIG. 1 to FIG. 5 preferably has, on a retaining plate 4, a first spring arm 2 which is preferably connected, centrally by way of its fixed spring arm end 20, to the retaining plate 4.

The spring arm 2 extends, by way of a spring arm section 26, away from the retaining plate 4 and ends at its free end 21 or at its free spring arm end 21. A switching element 22 is located at the free spring arm end 21, said switching element being designed, in an advantageous embodiment, with a contact dome 23 which is oriented in the direction of a switch 100. A slot 25 is located in the spring arm section 26.

The spring characteristic and therefore the spring constant of the spring arm 2 can be calibrated by means of the slot length of the slot 25. A respective projection 24a, 26b is located on the sides of the spring arm section 26 of the spring arm 2, said projections being situated diametrically opposite one another. The projections 24a, 24b are designed such that they can come into contact with the pairs 3a, 3b of spring arms which are still to be described or in each case with projections 34a, 34b of adjacent pairs 3a, 3b of spring arms as a result of operation. Expressed in another way, the projections are arranged so as to correspond to one another.

A spring arm 3a and a spring arm 3b are connected to the retaining plate 4 in each case adjacent to the first spring arm 2, preferably in an approximately parallel position, said spring arms 3a and 3b preferably being arranged on the retaining plate 4 in mirror-inverted fashion and therefore symmetrically in relation to the spring arm 2.

The spring arm 3a, 3b together forms a pair 3a, 3b of spring arms which are connected to one another at their ends of the spring arms 3a, 3b, which ends are situated opposite the retaining plate 4, by means of a connecting section 30.

The connecting section 30 is preferably arranged as a web between the ends of the spring arms 3a, 3b at a distance from the first spring arm 2.

The profile of the spring arms 3a, 3b is advantageously designed such that an inclined ramp or a run-on bevel 31a, 31b adjoins a substantially flat or planar spring arm section 35a, 35b, the ends of said run-on bevels being connected to one another, specifically by the connecting section 30. The connecting section 30 is substantially in the form of a flat bearing section 32.

If a card is inserted into a card reader having a switch spring arrangement according to the invention, a card edge can run along the pair 3a, 3b of spring arms, over the run-on bevels 31a, 31b and press on the bearing section 32 by way of its card lower face, as a result of which the pair 3a, 3b of spring arms is deflected, specifically in the direction of the first spring arm 2.

The projections 34a, 34b are located in the region of the spring arm sections 35a, 35b in a manner corresponding in position to the projections 24a, 24b of the first spring arm 2, said projections 34a, 34b being arranged such that, when the pairs 3a, 3b of spring arms are operated, said projections make contact or function as a bearing point.

Figure 4:
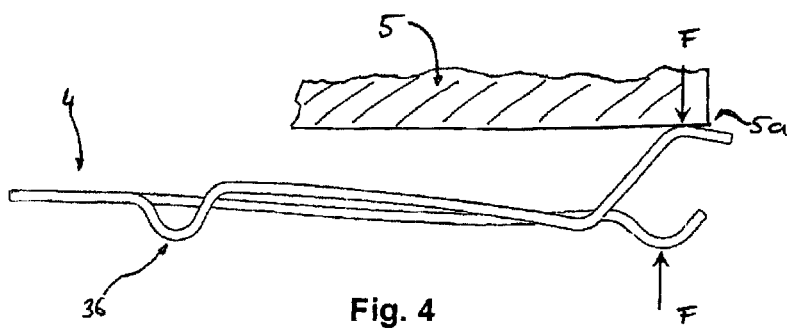
FIG. 4 shows a side view, similar to FIG. 2, in which the switch spring arrangement has been partially operated by a card.
Figure 3:
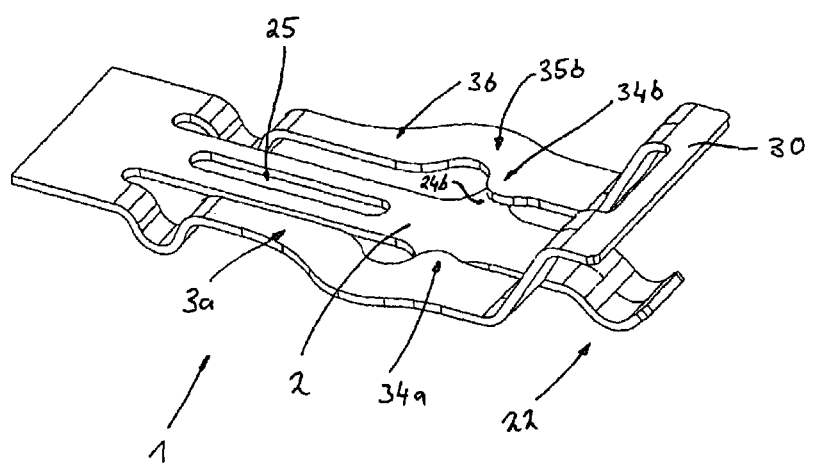
FIG. 3 shows a perspective view of a switch spring arrangement according to the invention according to FIG. 1 and FIG. 2.
Figure 5:
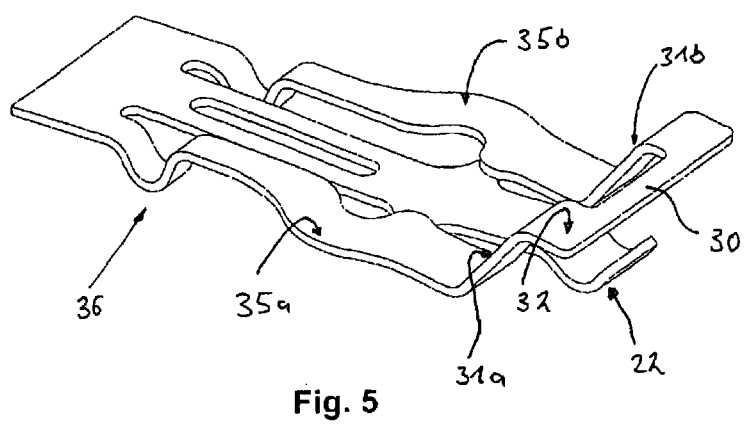
FIG. 5 shows a perspective view of the operated switch spring arrangement according to FIG. 4.

As shown in FIG. 4 and FIG. 5, the manner of operation of the switch operator means according to the invention or of the switch spring arrangement 1 according to the invention can be explained with reference to the two figures.

The switch spring arrangement 1 operates in accordance with the double-bar principle or double spring-bar principle.

The pair 3a, 3b of spring arms in each case forms a first spring bar which can deflect substantially upward in the views, whereas the second spring arm 2 forms a further spring bar which can deflect downward in the views, with the result that the deflection in the spring bar lines runs in an opposite direction.

This means that it is possible to use both maximum card thicknesses, so-called max cards, and minimum card thicknesses, such as min cards.

If a force F of a min card presses on the bearing section 32 of the pair 3a, 3b of spring arms, said bearing section 32 is operated in the direction of the second spring arm until the opposite bearings 34a, 34b and 24a, 24b, therefore the projections 24a, 24b, 34a, 34b, come into contact and operate the spring arm 2 in the direction of a switch 100, until it bears on the switch in a blocked manner.

In the event of operation with the minimum card, the spring arm 2 deflects only to a minimal extent and generates sufficient contact spring force on the switch 100.

If, however, the switch spring arrangement 1 is operated with a max card, the contact dome 23, after contact with the switch 100, likewise bears on said switch, however the pair 3a, 3b of spring arms is deflected further on account of the increased card thickness.

Owing to the construction according to the invention by means of corresponding spring arms, the spring arm 2 can be deflected further downward, even though the switching dome 23 of the switching element 22 of the first spring arm 2 bears on the switch 100 (block bearing), wherein the block bearing does not destroy the switch since the spring arm 2 can yield in an elastic manner.

Owing to this structural design, it is therefore possible to reproduce firstly the necessary spring force and secondly the tolerances in an ideal interaction relationship.

In a particularly advantageous embodiment, a gathered portion 36 is located on each spring arm 3a, 3b of the pair 3a, 3b of spring arms, preferably at corresponding locations. The gathered portion 36 is in the form of a substantially U-shaped bend in the spring arm sections 35a, 35b in each case. Owing to the gathered portion 36 of the pair 3a, 3b of spring arms, the spring constant and therefore the bending direction of the pair 3a, 3b of spring arms can be influenced in a prespecified manner.

In an advantageous embodiment, the gathered portion 36 is designed such that the position of the pair 3a, 3b of spring arms is arranged somewhat above the position of the spring arm 2 and, in the non-deflected state of the switch spring arrangement 1, the spring arms 2, 3a, 3b preferably run substantially in parallel planes.

Figure 2:
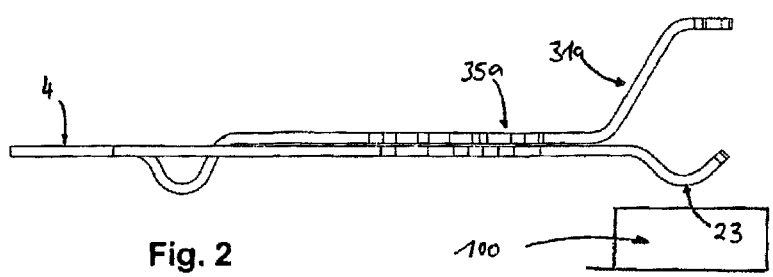
FIG. 2 shows a side view of a switch spring arrangement according to the invention similar to the view according to FIG. 1.

This structural refinement is shown particularly clearly in the side view in FIG. 2. This view also shows the substantially bent or U-shaped gathered portion of the pair 3a, 3b of spring arms. Owing to this gathered portion, the position of the pair 3a, 3b of spring arms can be arranged above the position of the first spring arm 2 by suitable bending, as can likewise be clearly seen in the side view of FIG. 2.

Since the gathered portion is consequently arranged below the spring arm 2, but the bearings 34a, 34b press on the projections or bearings 24a, 24b from above, the spring bars of the respective spring arms are deflected in opposite directions as soon as a card presses on the connecting section 30 of the pair 3a, 3b of spring arms with the force F, as is clearly shown in FIG. 4 and FIG. 5.

The upper pair 3a, 3b of spring arms is deflected upward, whereas the spring arm 2 is deflected downward, that is to say in the opposite deflection direction, in order to operate the switch 100, so that a kind of intermediate space is produced between the spaced-apart spring arms 2, 3a, 3b, specifically between the retaining plate 4 and the contact point of the bearings or projections 24a, 24b and 34a, 34b in the side view.

If a card 5 is moved in a card reader, not illustrated, or in a card contact-making apparatus, the card end 5a strikes a run-on bevel 31a, 31b of the pair 3a, 3b of spring arms, and the lower face of the card 5 slides onto the connecting section 30 or onto the substantially flat section of the connecting section, specifically the bearing section 32. If the card 5 now pushes the pair 3a, 3b of spring arms downward with a force F, a layer-like bearing on the spring arm 2 is produced at the contact point of the spring arms 2, 3a, 3b, specifically at the projections 24a, 24b and 34a, 34b, said spring arm 2 consequently being operated by the pair 3a, 3b of spring arms, specifically by way of its switching element 22 onto a switch 100 which is located beneath it.

LIST OF REFERENCE SYMBOLS

Switch spring arrangement

1 Switch spring arrangement
2 First spring arm
3a, 3b Pair of spring arms
4 Retaining plate
5 Card
5a Card end
20 Fixed spring arm end
21 Free spring arm end
22 Switching element
23 Contact dome
24a, 24b Projections
25 Slot
26 Spring arm section
30 Connecting section
31a, 31b Run-on bevel
32 Bearing section
34a, 34b Projections
35a, 35b Spring arm section
36 Gathered portion
100 Switch
F Force

The invention claimed is:

1. A switch spring arrangement for operating a switch, comprising
   a first spring arm which can be operated by a card and at least one second spring arm with a contact dome at its free end for operating a switch which is located beneath the contact dome of the second spring arm, characterized in that the first spring arm can be operated by the second spring arm, the first spring arm comprising two spring arms which are arranged substantially parallel, and each of the two spring arms has a spring arm section,
   wherein the spring arm sections have projections which, in their position, are arranged correspondingly adjacent to projections of the second spring arm so that, when the two spring arms are operated in the direction of the second spring arm, the projections interact with the projections of the second spring arm.

2. The switch spring arrangement as claimed in claim 1, characterized in that the second spring arm is attached, by way of its fixed end, to a retaining plate of the switch spring arrangement.

3. The switch spring arrangement as claimed in claim 2, characterized in that the second spring arm has, at its free end, a switching element, together with its contact dome, for operating a switch.

4. The switch spring arrangement as claimed in claim 2, characterized in that the second spring arm has, between its free end and its fixed end, a spring arm section, wherein the projections are arranged on the sides of the spring arm section.

5. The switch spring arrangement as claimed in claim 1, characterized in that the two spring arms are attached, at their fixed ends, to a retaining plate.

6. The switch spring arrangement as claimed in claim 5, characterized in that free ends, situated opposite the fixed ends of the two spring arms, are connected to one another by a connecting section.

7. The switch spring arrangement as claimed in claim 6, characterized in that the spring arm sections are between the retaining plate and the connecting section.

8. The switch spring arrangement as claimed in claim 5, characterized in that each of the two spring arms has a gathered portion between the retaining plate and the projections.

9. The switch spring arrangement as claimed in claim 8, characterized in that the gathered portion are in the form of a substantially U-shaped section of the spring arms, which section is bent in the direction of the first spring arm.

10. The switch spring arrangement as claimed in claim 1, characterized in that the two spring arms each have an inclined section, specifically designed such that the inclined section is in the form of a bent section of the two spring arms.

* * * * *